May 8, 1956
J. LEYENBERGER
2,745,054
ELECTRICAL APPARATUS FOR MEASURING
Filed Oct. 16, 1952
2 Sheets-Sheet 1
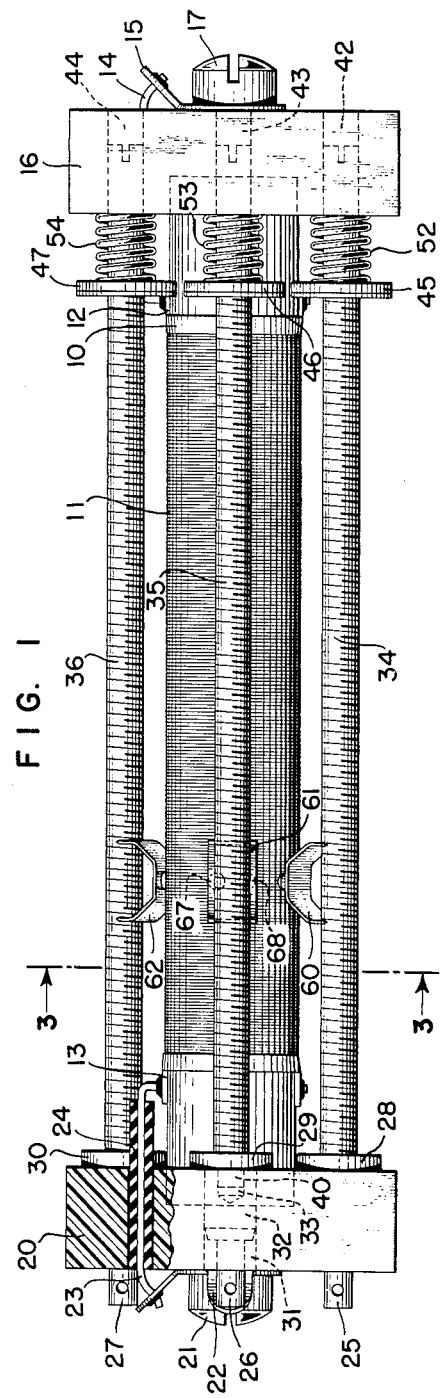
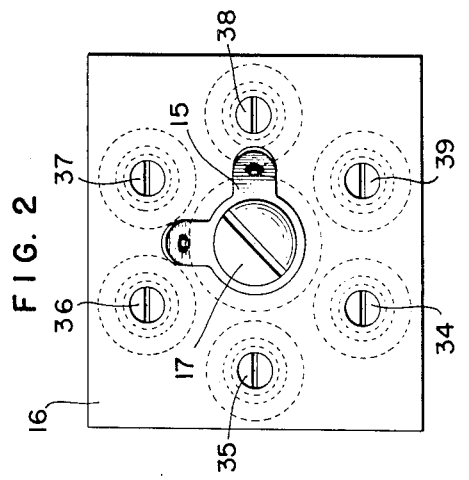
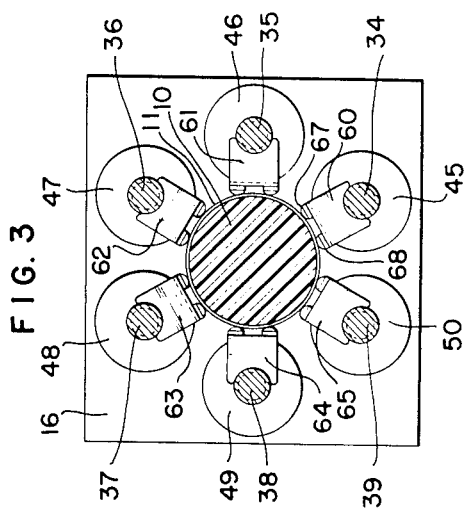
*INVENTOR.*
JOHN LEYENBERGER
BY
*Arthur H. Swanson*
ATTORNEY.

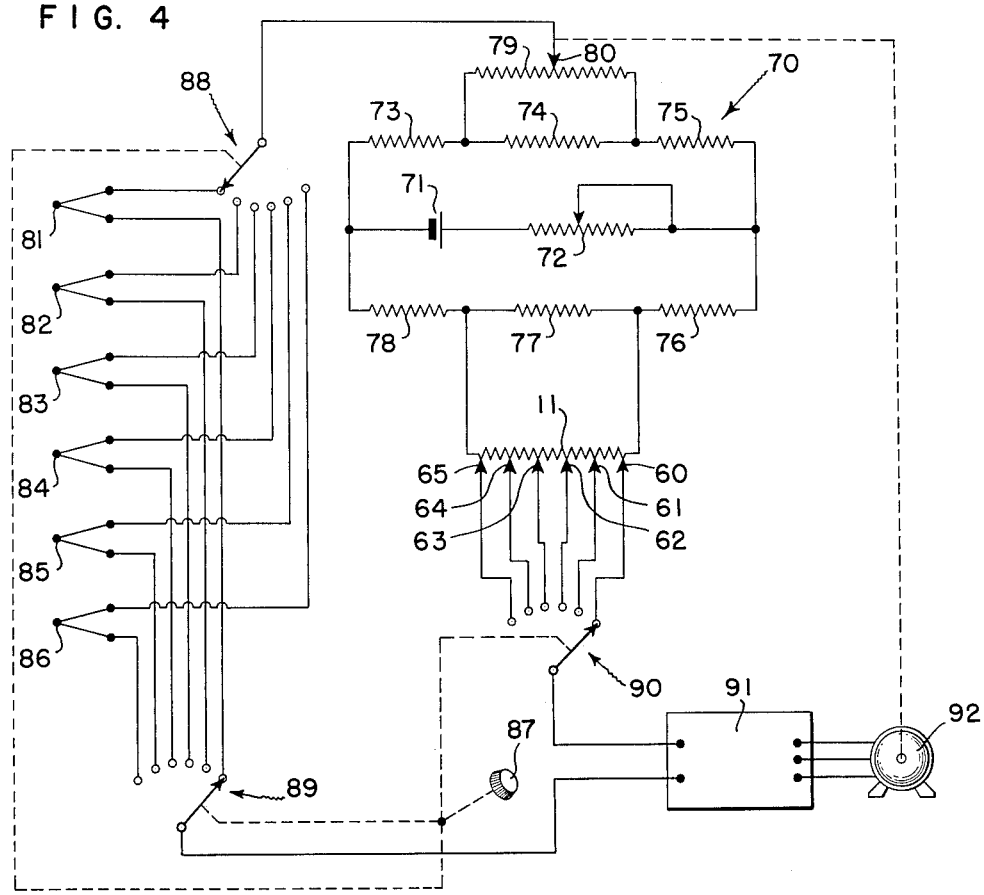

United States Patent Office 2,745,054
Patented May 8, 1956

2,745,054

ELECTRICAL APPARATUS FOR MEASURING

John Leyenberger, Willow Grove, Pa., assignor to Minneapolis-Honeywell Regulator Company, Minneapolis, Minn., a corporation of Delaware Application October 16, 1952, Serial No. 314,979

6 Claims. (Cl. 323—75)

The general object of the present invention is to provide a new and improved potentiometric apparatus. More specifically, the present invention is concerned with a potentiometric circuit employing a single resistor which will provide a plurality of calibration connections each of which are adjustable to any point on the resistor.

In potentiometric measuring circuits, especially those used to sense a plurality of variables, it is necessary that the measuring circuit always be maintained in a state of accurate calibration when each of the plurality of variables is being measured. It has heretofore been necessary to provide a plurality of wire wound resistors with each selected to provide a desired calibration for the particular variable being measured. Such an arrangement is not readily adapted to universal use and is very costly especially where a large number of variables are to be measured. To overcome the disadvantages of prior circuits and devices, there is a need for a highly accurate, readily adjustable, potentiometric apparatus having a plurality of points for connection with each being adjustable relative to the other without interference. Such apparatus must also be inexpensive and easily manufactured.

It is accordingly an object of the present invention to provide a new and improved potentiometric apparatus.

Another object of the present invention is to provide a potentiometric apparatus employing a single resistor element having a plurality of adjustable points of connection therefor.

Still another object of the present invention is to provide a potentiometric device including a single wire wound resistor unit having a plurality of adjustable sliders associated therewith with each of the sliders being independently adjustable to any position on the resistor.

A further object of the present invention is to provide a single adjustable apparatus for use in a multi-point variable measuring circuit wherein the apparatus may be used to calibrate the measuring circuit for each of the variables to be measured by the measuring circuit.

A still further object of the present invention is to provide a new and improved potentiometer device including a bobbin wound resistor having a plurality of adjustable contactors spaced around the periphery of the bobbin with each contactor being independently adjustable to any point on the bobbin regardless of the position of the other contactors.

The various features of novelty which characterize this invention are pointed out with particularity in the claims annexed hereto and forming a part of the specification. For a better understanding of the invention, however, its advantages, and specific objects obtained with its use, reference should be had to the accompanying drawings and descriptive matter in which is illustrated and described a preferred embodiment of the invention.

Figure 1 is a side view of the principal portion of the present apparatus. Figure 2 is an end view of the apparatus shown in Figure 1;

Figure 3 is a cross-sectional view of a portion of the apparatus in Figure 3 taken along the sectional lines 3—3; and Figure 4 is an electrical circuit showing one manner in which the apparatus may be used in a potentiometric measuring circuit.

Referring now to Figure 1, the numeral 10 represents a bobbin which may be constructed of a suitable insulating material. As constructed, this bobbin is a circular cylindrical member although it could assume other desired shapes without departing from the general concept of the invention. Wound upon this bobbin is a resistance wire 11, the wire being wound in a conventional manner from a contacting terminal 12 on the right end of the bobbin to a contacting terminal 13 on the left end of the bobbin. An electrical lead 14 connects the terminal 12 to a contacting terminal 15. Mounted on the right end of the bobbin pin is a block 16 and this block is rigidly fastened to the end of the bobbin pin by means of the screw 17. This screw 17 also provides a fastening means for the electrical connecting terminal 15.

Viewed in Figure 2, the block 16 is a rectangular boxlike element having the screw 17 centered therein with a plurality of holes symmetrically spaced about the center screw 17.

A similar block 20 is provided on the opposite end of the bobbin 10 and is rigidly fastened thereto by a screw 21. This screw also serves as a fastening means for a connecting terminal 22, the latter of which is connected by means of a connecting wire 23 to the connection 13 on the bobbin 10. The connecting wire 23 passes through the block 20 and has an insulated covering 24 therearound.

Symmetrically spaced about the screw 21 in the block 20 are a plurality of connecting terminals 25, 26, and 27, as well as three additional ones not shown. These connecting terminals extend through the block 20 and have a shoulder on the opposite side identified by the numerals 28, 29, and 30. Viewing the terminal 26 in particular, it will be seen that this terminal extends from the shoulder 29 where the shoulder overlaps the block 20 and then into a hole 31 where an enlarged portion of the terminal at 32 is pressed into the hole. Each terminal has a hole centered on the side thereof in the shoulder, as at 33 in shoulder 29.

Extending between the holes in the shoulders of the connecting terminal in the block 20 and the holes in the block 16 are a plurality of screw threaded members 34, 35, and 36, as well as three additional members 37, 38, and 39 shown in Figure 3. Each of the screw threaded members has a reduced end section which projects into the associated terminal as at 40 on the member 35. With the reduced section projecting into the hole 33, the enlarged portion of the member will bear against the shoulder 29 to make an electrical contact. The other ends of the terminals project into holes in the block 16 as at 42, 43, and 44. Each of the members has a slot in the end thereof so as to readily receive a screwdriver or other adjusting instrument.

Each of the members 35 through 39 has a washer like member fastened to the associated member adjacent the block 16. These washer like members are identified by the numerals 45 through 50. Bearing between these washers and the block 16 are a plurality of springs 52, 53, 54, and three additional springs not shown in any of the figures but correspondingly associated with the screw threaded members 37, 38, and 39.

Viewing the screw threaded member 35 as an example, it will be seen that the spring 53 bearing against the washer 46 will force the screw threaded member so that the reduced end thereof will project into the hole 33 and the shoulder on the threaded member will be bearing against the shoulder 29 so as to make an electrical contact therewith. In assembly, the screw threaded member would be forced so that its end adjacent the block 16 is pushed into the block to compress the associated spring and then the end adjacent the block 20 is brought into alignment with the appropriate hole on the shoulder of the contacting element. The associated spring will always maintain the threaded member bearing against the electrical contactor.

For making electrical contact between the threaded member and the wire 11, there are provided a plurality of U-shaped contacting elements which are formed of flattened metal stock with the open ends of the U having a semi-circular recess with the recess engaging the associated threads of the screw threaded member. These members are identified by the numerals 60 through 65. Each of the contacting elements has a pair of wire contacting buttons as at 67 and 68 in Figure 3. This insures that the contacting is made at the desired position on the resistance wire. Each of the contactors 60 through 65, when placed in position, have sufficient resiliency to bear against the resistance wires so that the associated buttons will make good electrical contact with the wire. In order that good electrical contact be made between the connectors 60 through 65 and their associated screw threaded members, both of these members may be silver plated.

In order to cause movement of the associated contactors, it is necessary to turn the screw threaded members and the associated contactors will follow the threading of the associated member. In this way, each of the contacting members may be moved to any desired position on the associated resistor wire 11. Inasmuch as the contactors are symmetrically spaced around the bobbin 10, it is possible to adjust any one or all of the associated contactors to any desired position on the resistor 11 without interfering with the position of any of the others.

The electrical connections for the apparatus are such that the ends of the resistor wire 11 are connected to the terminals 15 and 22. The adjustable contact with the resistor 11 is made through a circuit from the contactors 60 through 65, the associated screw threaded members 34 through 39, to the terminals on the end of the block 20.

Referring now to Figure 4, there is shown one form that an electrical circuit using the present invention may assume. The basic electrical circuit disclosed in Figure 4 is a potentiometric circuit arranged so that a thermocouple voltage is connected in opposition to a voltage originating from a balanceable electrical direct current network. The particular circuit disclosed is arranged for using a single balanceable network for a plurality of separate thermocouples which are selectively connected to the rebalanceable network.

More specifically Figure 4 discloses a balanceable electrical network 70. This network comprises a source of potential in the form of a battery 71 connected through an adjustable rheostat 72 to the input terminal of the network 70. Included in the arms of the network 70 are resistors 73, 74, and 75 as well as resistors 76, 77, and 78, the latter of which are connected in series parallel relation to the first three mentioned resistors. The resistor 78 may be a temperature compensating resistor to provide a conventional thermocouple cold junction temperature compensation in a manner well known in the art. Connected across the resistor 74 is a rebalancing slidewire resistor 79 which has an associated slider 80. Connected across the resistor 77 is a slidewire resistor 11 which may correspond to the slidewire 11 shown in Figure 1. Associated with this slidewire are a plurality of contacts 60 through 65 which again may correspond to the contacts shown in Figure 1.

Arranged for connection in series with the output of the network 70 are a plurality of thermocouples 81 through 86 with each of these thermocouples exposed to a desired temperature whose magnitude is to be measured.

For selecting which thermocouple is to be connected in series with the rebalancing circuit 70, there is provided a manual selector 87 which operates a plurality of ganged switches 88, 89, and 90. While a manual selector has been shown, it will be obvious that a motor driven selector might be used.

For detecting the electrical signals which may exist when there is an unbalance between the magnitude of the voltage of the selected thermocouple and the output of the network 70, there is provided an amplifier and converter 91 which is effective to drive a reversible motor 92. The motor 92 may also be used to drive a suitable indicating and recording mechanism. A showing of a suitable indicating and recording mechanism incorporating a convertible amplifier section as well as a reversible motor which drives the recorder and indicator will be found in a Walter P. Willis patent, 2,423,540, issued July 7, 1947.

In setting up the apparatus of Figure 4 for operation, each of the sliders 60 through 65 will be positioned on the resistor wire 11 in accordance with the calibration desired for the thermocouple associated with the particular slider. As each of the sliders may be moved to any position on the resistor 11, it is possible to obtain an extremely wide range of operation as concerns calibration. This arrangement permits very accurate calibration of the electrical circuit in that the calibration is accomplished on a resistance slidewire which is extremely accurate. Another advantage of this particular arrangement is that the slidewire used for calibration is the same for each of the separate thermocouples and for this reason the circuit constants associated with the slidewire resistor 11 will be the same for each of the thermocouples which lends itself to more consistent results in the overall operation of the apparatus.

In the overall circuit operation, the selector switch 87 will be positioned to a desired point and this will select a predetermined thermocouple, such as thermocouple 81 when the switches are in the position shown upon the drawing. The output potential from the thermocouple 81 will be opposed to the output voltage from the network 70 and applied to the input of the converter and amplifier section 91. Any unbalance signal on the input of this amplifier will produce operation of the motor 92. The direction of the operation of motor 92 will be such as to move the slider 80 over the associated rebalancing slidewire 79 to change the output voltage in the network 70 so that the magnitude thereof will counterbalance the magnitude of the voltage output from the thermocouple 81. The operation is the same when the selector switch 87 is moved to any of the other positions to detect the output voltage from the other thermocouples.

From the foregoing it will be seen that there has been provided for a potentiometric measuring apparatus a simple, readily adjustable, accurate and inexpensive multi-point potentiometer device. It will also be obvious that there has been provided a new and improved potentiometric measuring apparatus incorporating a potentiometric device utilizing a single slidewire resistor with a plurality of connecting points therefor.

While, in accordance with the provisions of the statutes, there has been provided and illustrated the best form of the invention known, it will be apparent to those skilled in the art that changes may be made in the form of the apparatus disclosed without departing from the spirit of the invention as set forth in the appended claims, and that certain features of the invention may be sometimes used to advantage without corresponding use of other features.

Having now described my invention, what I claim as new and desire to secure by Letters Patent is as follows:

1. A potentiometric apparatus comprising, an insulated bobbin with a resistance wire wound thereon, a pair of insulated blocks mounted on each end of said bobbin, a plurality of metallic screw threaded members mounted in said blocks and extending along said bobbin in spaced relation thereto, a separate unitary metallic contactor for each of said screw threaded members, said contactor threadedly engaging the associated threaded member and being resiliently self biased against the wire on said bobbin, and means for separately adjusting each of said threaded members to cause said associated contactors to be moved to any position on said bobbin regardless of the position of any other contactor on said bobbin.

2. A potentiometric device comprising, an elongated bobbin of insulating material having a resistance wire wound thereon, a first insulated block mounted on one end of said bobbin, a second insulated block mounted on the opposite end, a plurality of metallic contact surfaces peripherally spaced about said bobbin and mounted in said first block, a corresponding plurality of holes extending through said second block and spaced relative to said bobbin at said contact surfaces, a plurality of screw threaded members projecting into said holes and bearing against said contact surfaces, a plurality of unitary resilient metallic screw following members with at least one associated with each of said threaded members, said following members each engaging said resistance wire at two distinct points to establish electrical contact between said threaded members and said resistance wire, and electrical connecting terminals for each of said threaded members and said resistance wire.

3. A potentiometric device comprising, an elongated bobbin of insulating material having a resistance wire wound thereon, a first insulated block mounted on one end of said bobbin, a second insulated block mounted on the opposite end, a plurality of metallic contact surfaces peripherally spaced about said bobbin and mounted in said first block, a corresponding plurality of holes extending through said second block and spaced relative to said bobbin at said contact surfaces, a plurality of screw threaded members projecting into said holes and bearing against said contact surfaces, each of said threaded members having a shoulder adjacent said second block, resilient means bearing between said shoulder and said block on each of said threaded members to maintain said members in tight electrical contact with said contact surfaces, a plurality of resilient metallic screw following members, said following members directly engaging said resistance wire and said threaded members to establish electrical contact between said threaded members and said resistance wire, and electrical connecting terminals for each of said threaded members and said resistance wire.

4. A potentiometric device comprising, an elongated bobbin of insulating material having a resistance wire wound thereon, a first insulated block mounted on one end of said bobbin, a second insulated block mounted on the opposite end, a plurality of metallic contact surfaces peripherally spaced about said bobbin and mounted in said first block, a corresponding plurality of holes extending through said second block and spaced relative to said bobbin at said contact surfaces, a plurality of screw threaded members projecting into said holes and bearing against said contact surfaces, each of said threaded members having a shoulder adjacent said second block, resilient means bearing between said shoulder and said block on each of said threaded members to maintain said members in tight electrical contact with said contact surfaces, a plurality of resilient metallic screw following members, said following members directly engaging said resistance wire and said threaded members to establish electrical contact between said threaded members and said resistance wire, and each comprising a flattened U shaped member having the open ends of the U formed to threadedly engage the associated threaded member with the closed end of the U engaging the resistance wire, and electrical connecting terminals for each of said contact surfaces and said resistance wire.

5. In a potentiometric measuring apparatus, the combination comprising, a balanceable electrical network, a plurality of sources of signal potential arranged for selectable comparison with a potential on said network, and means including a plurality of calibration connections in said network selectable in accordance with said sources of signal potential, said means comprising, an elongated bobbin of insulating material having a resistance wire wound thereon, a first insulated block mounted on one end of said bobbin, a second insulated block mounted on the opposite end, a plurality of metallic contact surfaces peripherally spaced about said bobbin and mounted in said first block, a corresponding plurality of holes extending through said second block and spaced relative to said bobbin at said contact surfaces, a plurality of screw threaded members projecting into said holes and bearing against said contact surfaces, a plurality of unitary resilient metallic screw following members with at least one associated with each of said threaded members, said following members being self biased toward and engaging said resistance wire to establish electrical contact between said threaded members and said resistance wire, and electrical connecting terminals for each of said threaded members and said resistance wire.

6. In a potentiometric measuring apparatus, the combination comprising, a balanceable electrical network, a plurality of sources of signal potential arranged for selectable comparison with a potential on said network, and means including a plurality of calibration connections in said network selectable in accordance with said sources of signal potential, said means comprising, an elongated bobbin of insulating material having a resistance wire wound thereon, a first insulated block mounted on one end of said bobbin, a second insulated block mounted on the opposite end, a plurality of metallic contact surfaces peripherally spaced about said bobbin and mounted in said first block, a corresponding plurality of holes extending through said second block and spaced relative to said bobbin as said contact surfaces, a plurality of screw threaded members projecting into said holes and bearing against said contact surfaces, each of said threaded members having a shoulder adjacent said second block, resilient means bearing between said shoulder and said block on each of said threaded members to maintain said members in tight electrical contact with said contact surfaces, a plurality of resilient metallic screw following members, said following members engaging said resistance wire to establish electrical contact between said threaded members and said resistance wire, and each comprising a flattened U-shaped member having the open ends of the U formed to threadedly engage the associated threaded member with the closed end of the U engaging the resistance wire, and electrical connecting terminals for each of said contact surfaces and said resistance wire.

References Cited in the file of this patent

UNITED STATES PATENTS

| | | |
|---|---|---|
| 1,757,110 | Chapman | May 6, 1930 |
| 1,757,971 | McKibben | May 13, 1930 |
| 2,561,317 | Ruge | July 17, 1951 |

FOREIGN PATENTS

| | | |
|---|---|---|
| 3,191 | Great Britain | of 1909 |
| 660,344 | Great Britain | Nov. 7, 1951 |